United States Patent
Krishnapura Subbaraya et al.

(10) Patent No.: US 10,636,123 B2
(45) Date of Patent: Apr. 28, 2020

(54) METHOD AND DEVICE FOR DE-NOISING IMAGES

(71) Applicant: WIPRO LIMITED, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

(*) Notice: Subject to any disclaimer, the term of this patent is extended or adjusted under 35 U.S.C. 154(b) by 138 days.

(21) Appl. No.: 16/021,288

(22) Filed: Jun. 28, 2018

(65) Prior Publication Data
US 2019/0355099 A1 Nov. 21, 2019

(30) Foreign Application Priority Data
May 15, 2018 (IN) .............................. 201841018216

(51) Int. Cl.
*G06T 5/00* (2006.01)
*G06T 7/10* (2017.01)
(Continued)

(52) U.S. Cl.
CPC .............. *G06T 5/002* (2013.01); *G06N 3/084* (2013.01); *G06N 5/046* (2013.01); *G06T 3/4046* (2013.01); *G06T 7/10* (2017.01)

(58) Field of Classification Search
CPC ......... G06T 5/002; G06T 7/10; G06T 3/4046; G06N 5/046; G06N 3/084
See application file for complete search history.

(56) References Cited

U.S. PATENT DOCUMENTS

2015/0235350 A1* 8/2015 Kwan .................. G06T 5/002
                                                            382/254
2017/0076170 A1* 3/2017 Tuzel .................... G06K 9/40
(Continued)

FOREIGN PATENT DOCUMENTS

CN       106251303 A    12/2018
WO       2018018470 A1   2/2018

OTHER PUBLICATIONS

Remez, T., et al., "Deep Convolutional Denoising of Low-Light Images", Cornell University (2017), 11 pages.
(Continued)

*Primary Examiner* — Brandon J Miller
(74) *Attorney, Agent, or Firm* — Finnegan, Henderson, Farbow, Garrett & Dunner, LLP (57) ABSTRACT

A method and device for removing noise from an image is disclosed. The method includes creating a single dimensional vector for an image through a multi-layer neural network. The method further includes converting the single dimensional vector into a multi-dimensional matrix based on number of layers in the multi-layer neural network. The method includes generating a feature hierarchy based on the multi-dimensional matrix, such that the feature hierarchy comprises a plurality of levels, and each level in the plurality of levels comprises at least one feature associated with the image. The method further includes creating a plurality of segments for the image based on the feature hierarchy, such that each of the plurality of segments includes a set of features associated with the image. The method includes removing each segment comprising noise from the plurality of segments to generate a de-noised image.

20 Claims, 6 Drawing Sheets

(51) Int. Cl.
*G06N 5/04* (2006.01)
*G06N 3/08* (2006.01)
*G06T 3/40* (2006.01)

(56) References Cited

U.S. PATENT DOCUMENTS

| | | | |
|---|---|---|---|
| 2018/0204314 A1* | 7/2018 | Kaplanyan | G06T 5/002 |
| 2019/0096038 A1* | 3/2019 | El-Khamy | G06T 5/002 |
| 2019/0108618 A1* | 4/2019 | Hwang | G06N 3/0454 |
| 2019/0114742 A1* | 4/2019 | Wang | G06K 9/627 |

OTHER PUBLICATIONS

Zhou, Y., et al., "Polarimetric SAR Image Classification Using Deep Convolutional Neural Networks", IEEE vol. 13, No. 12 (2016), pp. 1935-1939.

\* cited by examiner

METHOD AND DEVICE FOR DE-NOISING IMAGES

TECHNICAL FIELD

This disclosure relates generally to processing images, and more particularly to method and device for de-noising images.

BACKGROUND

Digital image processing plays crucial role in improving quality of digital images. An important aspect of the digital image processing is noise removal or noise reduction. Noise in an image may include random variation of brightness or color information and may manifest as graininess in the image. Further, it is observed that scan images (digital scans of documents) are more prone to noise. Noise may be introduced in an image in various ways, depending on how the image is created. Noise removal or reduction therefore becomes an important part of image processing and for improving accuracy of extracting data from an image.

One of the conventional systems provides for removing noise in form of speckle from an input noisy images using Image Despeckling Convolutional Neural Network (ID-CNN). The ID-CNN may include a component-wise division of residual layers to estimate the noise speckle, and removing the speckles in the image. Another conventional system provides for a back propagation CNN which may involve adjusting a proportion coefficient of a convolution operation result output by different convolution units in the last convolution layer synthesized by an output layer in the CNN. The adjusted convolutional neural network may then be used for de-noising the image. Another conventional system utilizes a depth full-convolution coding-decoding network for carrying out image noise reduction, while using a convolution layer for coding main content of the image for noise reduction, and a de-convolution layer for decoding abstract content of the image and recovering detailed content of the image.

SUMMARY

In one embodiment, a method for de-noising images is disclosed. The method includes creating a single dimensional vector for an image through a multi-layer neural network. The method further includes converting the single dimensional vector into a multi-dimensional matrix based on number of layers in the multi-layer neural network. The method further includes generating a feature hierarchy based on the multi-dimensional matrix, such that the feature hierarchy comprises a plurality of levels, and each level in the plurality of levels comprises at least one feature associated with the image. The method further includes creating a plurality of segments for the image based on the feature hierarchy, such that each of the plurality of segments comprises a set of features associated with the image. The method further includes removing each segment comprising noise from the plurality of segments to generate a de-noised image.

In another embodiment, an image de-noising device for removing noise from an image is disclosed. The image de-noising device includes a processor and a memory communicatively coupled to the processor, wherein the memory stores processor instructions, which, on execution, causes the processor to create a single dimensional vector for an image through a multi-layer neural network. The processor instructions further cause the processor to convert the single dimensional vector into a multi-dimensional matrix based on number of layers in the multi-layer neural network. The processor instructions further cause the processor to generate a feature hierarchy based on the multi-dimensional matrix, such that the feature hierarchy comprises a plurality of levels, and each level in the plurality of levels comprises at least one feature associated with the image. The processor instructions further cause the processor to create a plurality of segments for the image based on the feature hierarchy, wherein each of the plurality of segments comprises a set of features associated with the image. The processor instructions further cause the processor to remove each segment comprising noise from the plurality of segments to generate a de-noised image.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating a single dimensional vector for an image through a multi-layer neural network; converting the single dimensional vector into a multi-dimensional matrix based on number of layers in the multi-layer neural network; generating a feature hierarchy based on the multi-dimensional matrix, wherein the feature hierarchy comprises a plurality of levels, and wherein each level in the plurality of levels comprises at least one feature associated with the image; creating a plurality of segments for the image based on the feature hierarchy, wherein each of the plurality of segments comprises a set of features associated with the image; and removing each segment comprising noise from the plurality of segments to generate a de-noised image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
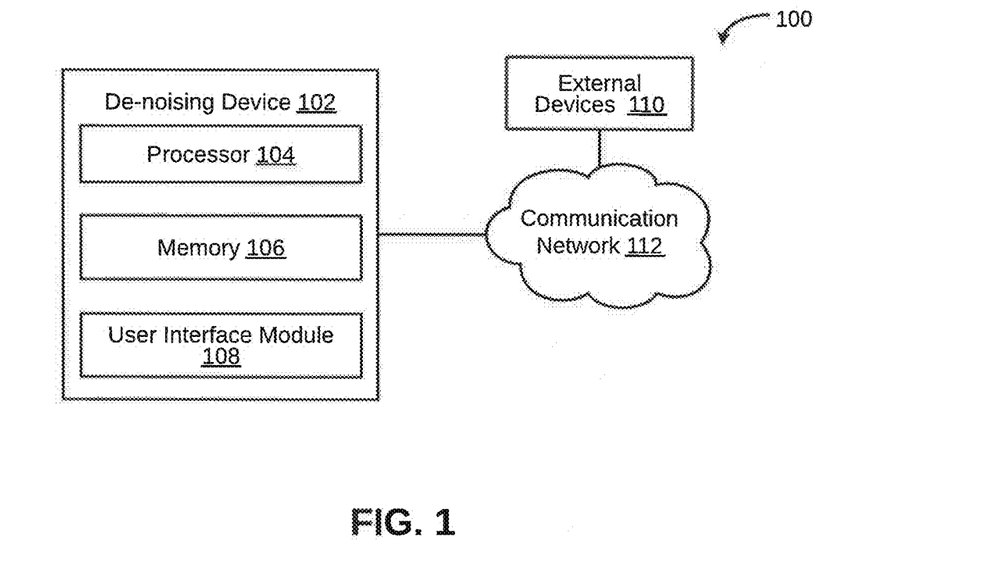
FIG. 1 is a block diagram illustrating a system for de-noising an image, in accordance with an embodiment.

In one embodiment, a system 100 for de-noising images is illustrated in the FIG. 1, in accordance with an embodiment. The system 100 may be a computing device having image processing capability. Examples of the computing device, may include, but are not limited to server, desktop, laptop, notebook, netbook, tablet, smartphone, mobile phone, or the like. In particular, the system 100 may include a de-noising device 102 for removing noise from the images, such as, digital images. As will be described in greater detail in conjunction with FIGS. 2-6, the de-noising device 102 may create a single dimensional vector for an image through a multi-layer neural network, and convert the single dimensional vector into a multi-dimensional matrix based on number of layers in the multi-layer neural network. Further, the de-noising device 102 may generate a feature hierarchy based on the multi-dimensional matrix. Further, the de-noising device 102 may create a plurality of segments for the image based on the feature hierarchy, and remove each segment that includes noise from the plurality of segments to generate a de-noised image.

To this end, the de-noising device 102 may include a processor 104 and a memory 106. The memory 106 may store instructions that, when executed by the processor 104, cause the processor 104 to detect and remove noise from an image in accordance with aspects of the present disclosure. The memory 106 may also store various data (for example, image to be de-noised, features and their spatial properties, hierarchy of features, semantic segments, machine learning model, spatial information derived from the hierarchy of features, semantic information corresponding to plurality of segments, single dimensional vector, multi-dimensional matrix, or noise data, etc.) that may be captured, processed, and/or required by the system 100. The de-noising device 102 may further include a user interface module 108, which may be used by a user or an administrator to interact with the de-noising device 102.

The de-noising device 102 may also interact with one or more external devices 110 over a communication network 112 for sending or receiving various data. Examples of the external devices 110 may include, but are not limited to a remote server, a digital camera, a Closed Circuit Television (CCTV) camera, a smart camera, or any other computing device.

Figure 2:
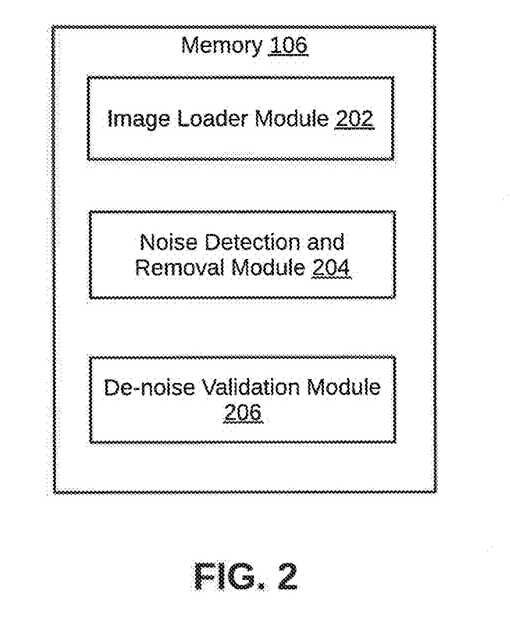
FIG. 2 illustrates a functional block diagram of a memory 106 within a de-noising device configured to de-noise images, in accordance with an embodiment.

Referring now to FIG. 2, a functional block diagram of the memory 106 within the de-noising device 102 configured to de-noise images is illustrated, in accordance an embodiment. The memory 106 may include various modules that perform functions to detect and remove noise from images. The memory 106 may include an image loader module 202, noise detection and removal module 204, and a de-noise validation module 206. As will be appreciated by those skilled in the art, all such aforementioned modules 202-206 may be represented as a single module or a combination of different modules. Moreover, as will be appreciated by those skilled in the art, each of the modules 202-206 may reside, in whole or in parts, on one device or multiple devices in communication with each other.

The image loader module 202 may receive an image, which may include various types of noises, such as, Gaussian noise, salt-and-pepper noise, shot noise, quantization noise, film grain, anisotropic noise, or periodic noise. As a result of one or more of these noises in the image, the image may be required to be de-noised. In one embodiment, the image loader module 202 may receive the image from one of the external devices 110. In another embodiment, the image loader module 202 may retrieve the image stored in a database (not shown in FIG. 2) within the memory 106. Upon receiving the image that is required to be de-noised, the image loader module 202 may forward the image to the noise detection and removal module 204 for further processing.

After the noise detection and removal module 204 receives the image, it may detect possible noises in the image in order to remove these noises. The noise detection and removal module 204 may employ machine learning techniques to generate a plurality of segments. The noise detection and removal module 204 may then detect one or more segments from the plurality of segments that include noise and thereafter may remove the one or more segments that include noise. This is further explained in detail in conjunction with FIG. 3.

It may be noted that even after de-noising the image by the noise detection and removal module 204, some noise may still remain in the image. In other words, the output image from the noise detection and removal module 204 may still be noisy. In this case, the de-noise validation module 206 may receive the output image from the noise detection and removal module 204 and may further validate whether the noise has been completely removed from the image or not.

In one embodiment, the de-noise validation module 206 may employ machine learning techniques to validate whether the noise has been completely removed from the image. Upon validation, the de-noise validation module 206 may generate a feedback about whether the image has been completely de-noised or not. For example, if according to the feedback, the image is not completely de-noised, the resultant image from the de-noise validation module 206 may loaded into the image loader module 202 again, and the process may be repeated until the image is completely de-noised. This is further explained in detail in conjunction with FIG. 3.

It should be noted that the de-noising device 102 may be implemented in programmable hardware devices such as programmable gate arrays, programmable array logic, programmable logic devices, or the like. Alternatively, the de-noising device 102 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by those skilled in the art, a variety of processes may be employed for removing noise from an image. For example, the exemplary system 100 and the associated de-noising device 102 may perform de-noising of the images by the processes discussed herein. In particular, as will be appreciated by those of ordinary skill in the art, control logic and/or automated routines for performing the techniques and steps described herein may be implemented by the system 100 and the associated de-noising device 102, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
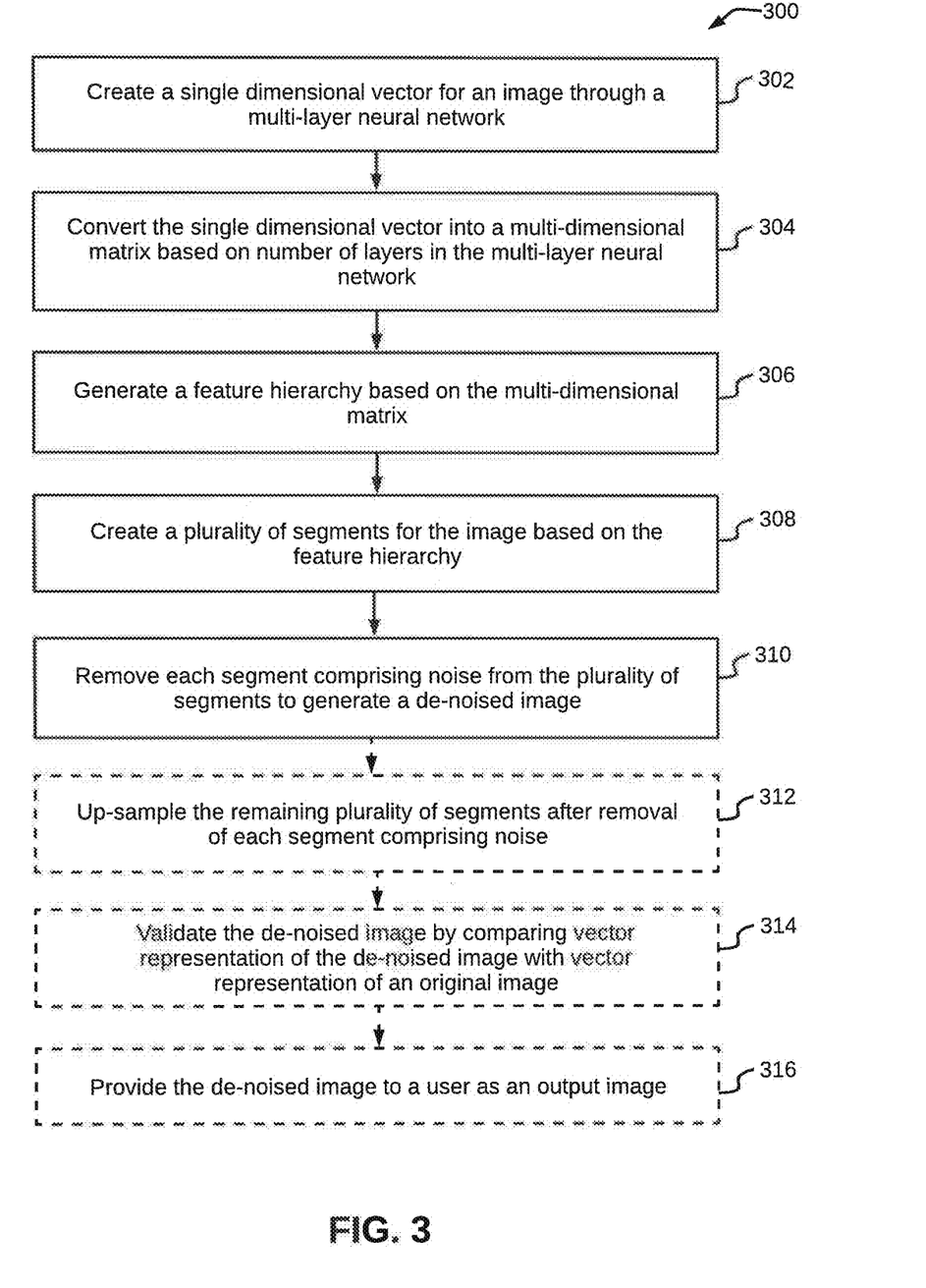
FIG. 3 illustrates a flowchart of a method for de-noising an image via a de-noising device, in accordance with an embodiment.

For example, referring now to FIG. 3, a flowchart of a method 300 for de-noising an image via the de-noising device 102 is illustrated, in accordance with an embodiment. As illustrated in the flowchart, the method 300 may include the step of creating a single dimensional vector for an image through a multi-layer neural network at step 302, converting the single dimensional vector into a multi-dimensional matrix based on number of layers in the multi-layer neural network at step 304, generating a feature hierarchy based on the multi-dimensional matrix at step 306, creating a plurality of segments for the image based on the feature hierarchy at step 308, and removing each segment comprising noise from the plurality of segments to generate a de-noised image at step 310. In some embodiments, the method 300 may further include the steps of up-sampling the remaining plurality of segments after removal of each segment comprising noise, validating the de-noised image by comparing vector representation of the de-noised image with vector representation of an original image, and providing the de-noised image to a user as an output image.

As mentioned earlier, at step 302, the de-noising device 102 may create a single dimensional vector for an image (that is required to be de-noised) through a multi-layer neural network. By way of an example, the image may be a scanned image of a document, such as a financial invoice. By way of another example, the image may be a scanned image of a photograph. It will be apparent to a person skilled in the art that the single dimension vector of the image may be mathematical formulas defining lines and shapes from one point to another.

The de-noising device 102 may create the single dimensional vector for the image using a multi-layer neural network (also referred to as multi-layer machine-learning network). The multi-layer neural network may employ statistical techniques to provide computer systems an ability to learn, or progressively improve performance on a specific task with data, without being explicitly programmed. The image may be passed through the multi-layer neural network to convert the image into the single dimensional vector. By way of an example, for a given image, the single dimensional vector may be represented by equation 1 given below:

$$[243,200,195,195,195 \ldots ,430,0] \quad (1)$$

As can be seen in the above example, the single dimensional vector representation of the image may include various values, which are associated with features of the image. At step 304, the de-noising device 102 may convert the single dimensional vector into a multi-dimensional matrix based on number of layers in the multi-layer neural network. The multi-layer neural network may include 'n' number of layers. In one embodiment, a first few layers of the multi-layer neural network may enhance the features of the single dimensional vector. The single dimensional vector may be converted to a multi-dimensional matrix after passing through one or more layers of the multi-layer neural network. In an embodiment, dimension of the multi-dimension matrix may be defined by a window size. For example, when the window size is three, the multi-dimension matrix may include three dimensions. By way of an example, when the single dimensional vector, represented by equation 1, is passed through three layers of the multi-layer neural network, the single dimensional vector may be converted into a three-dimensional matrix, which is represented by 2:

$$[[243,200,195],[200,195,195],[195,195,195],] \quad (2)$$

At step 306, the de-noising device 102 may generate a feature hierarchy based on the multi-dimensional matrix. The feature hierarchy may include a plurality of levels, such that each level in the plurality of levels may further include one or more features associated with the image. As first few layers in the multi-layer neural network may enhance features to generate the multi-dimensional matrix, the multi-dimensional matrix is used to generate the feature hierarchy. The feature hierarchy may be generated based on relative spatial properties of each feature.

The feature hierarchy may include a root node representing the image at a first level in the plurality of levels. Features in the remaining plurality of levels may combine to form the image at the first level. By way of an example of a feature hierarchy, an image is at first level in the feature hierarchy or the root node. After passing through first layer of the multi-layer neural network, edges in the image may be detected, which are placed at second level of the feature hierarchy. Thereafter, in the second layer of the multi-layer neural network, the image may be enhanced to obtain parts of an object in the image, which are placed at third level in the feature hierarchy. Later, by combining various multiple parts together, the object may be obtained, which is at the fourth level in the feature hierarchy. The object may refer to the spatial information of a pixel relative to other pixels around the object in the image. The second, third, and fourth level may be combined to obtain the image at the first level or the root node The de-noising device 102 may then use the generated feature hierarchy to create a plurality of segments for the image at step 308. Each of the plurality of segments may include a set of features associated with the image. The image may be segmented based on the spatial information obtained from the feature hierarchy. Further, the plurality of segments may be classified as segments that include noise and segments that do not include noise. The method of creating the plurality of segments based on the feature hierarchy for the image is further explained in detail in conjunction with FIG. 4. At step 310, the de-noising device 102 may remove each segment that includes noise from the plurality of segments to generate a de-noised image.

In an embodiment, at step 312, the de-noising device 102 may up-sample the remaining plurality of segments after removal of each segment that includes noise. By way of up-sampling, a higher precision of the resultant de-noised image may be obtained. In order to up-sample, the remaining plurality of segments may be passed through a multi-layer fully connected de-convolutional network. The de-noised image may then be provided as an output to a user.

However, when the multi-layer neural network is being trained, the de-noised image generated at the step 310 may not be completely de-noised. In other words, the de-noised image may still include some noise. In this case, at step 314, the de-noising device 102 may validate the de-noised image. In an embodiment, the de-noised image may be validated by comparing vector representation of the de-noised image generated at step 310 with vector representation of an original image associated with the de-noised image. In an embodiment, a multi-layer fully connected CNN may be used to validate the de-noised image. In other words, the de-noised image obtained by removing each segment that includes noise is checked to determine, whether the image has been completely de-noised or not. Further, if the image is not completely de-noised, the method 300 may be repeated until the image is completely de-noised. This is further explained in detail in conjunction with FIG. 5. The weights learnt by the multi-layer neural network, during each iteration for training the multi-layer neural network, are used to completely de-noise a noisy image in a single iteration.

Figure 4:
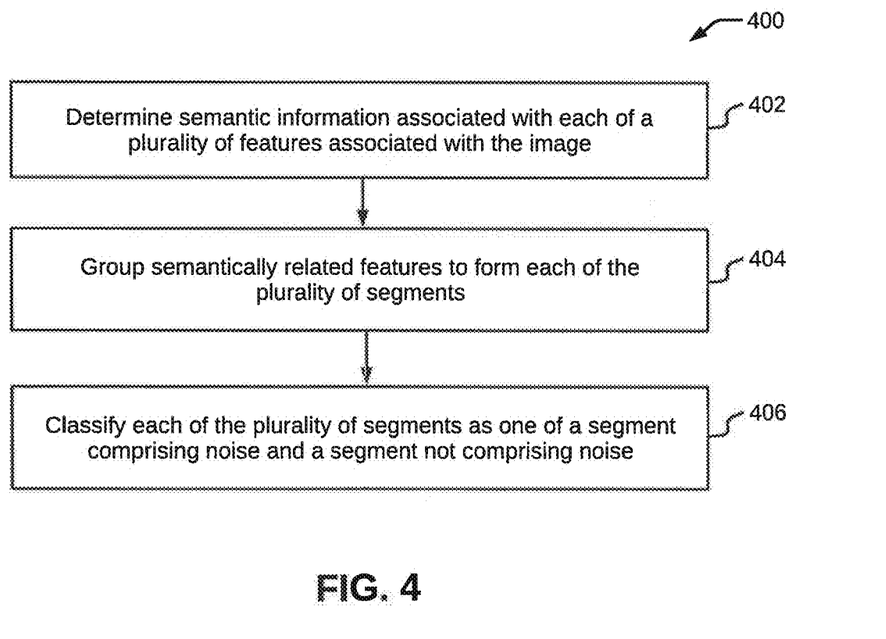
FIG. 4 illustrates a flowchart of a method for creating a plurality of segments for an image based on a feature hierarchy, in accordance with an embodiment.

Referring now to FIG. 4, a flowchart of a method 400 for creating a plurality of segments for an image based on a feature hierarchy is illustrated, in accordance with an embodiment. At step 402, semantic information associated with each of a plurality of features associated with the image may be determined. At step 404, the semantically related features may be grouped to form each of the plurality of segments. The plurality of segments may be formed by combining higher level semantic information with the lower level semantic information in the feature hierarchy. In an embodiment, fusing of layers in the multi-level neural network may enable learning fine level of semantics and spatial information with a greater accuracy. The information regarding the plurality of segments may then be passed to next set of layers, i.e., classifier layers, in the multi-layer neural network.

Thereafter, at step 406, each of the plurality of segments may be classified either as a segment that includes noise or as a segment that does not include noise. In an embodiment, each of the plurality of segments and their spatial and semantic information may be used to classify the noises in the image. Using this information, the plurality of segments may be classified as segments that include noise and segments that do not include noise. Thereafter, each of the plurality of segments that include noise may be removed from the plurality of segments to generate a de-noised image.

Figure 5:
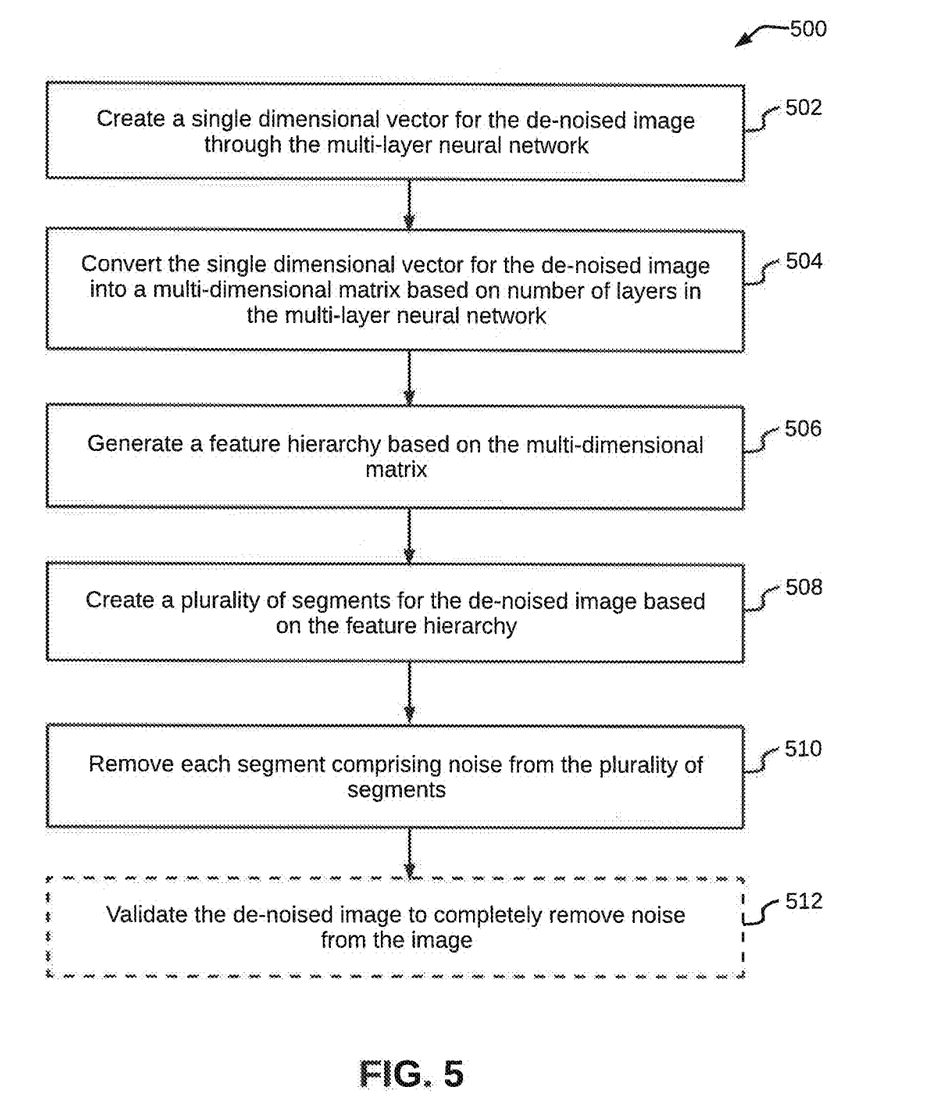
FIG. 5 illustrates a flowchart of a method for removing noise from a de-noised image, in accordance with an embodiment.

Referring now to FIG. 5, a flowchart of a method 500 for removing noise from a de-noised image is illustrated, in accordance with an embodiment. The method 500 is performed after execution of the step 314 in FIG. 3. If during validation at step 314, it is determined that the de-noised image generated at step 310 still includes noise, a single dimensional vector may be created for the de-noised image through the multi-layer neural network at step 502.

Thereafter, at step 504, the single dimensional vector for the de-noised image may be converted into a multi-dimensional matrix based on number of layers in the multi-layer neural network. At step 506, a feature hierarchy may be generated based on the multi-dimensional matrix. The feature hierarchy may include a plurality of levels, such that each level in the plurality of levels may include one or more features associated with the de-noised image. At step 508, a plurality of segments may be created for the de-noised image based on the feature hierarchy. Each of the plurality of segments may include a set of features associated with the de-noised image. At step 510, each segment that includes noise may be removed from the plurality of segments. Thus, the remaining plurality of segments may combine to form an image that does not include noise. In other words, remaining noise in the de-noised image generated at step 310 is removed by performing steps 502 to 510. Steps 502 to 510 are analogous to step 302 to 310, which have already been explained in detail in conjunction with FIG. 3, for an image which has not been de-noised.

In order to further ensure that noise is completely removed from the de-noised image, at step 512, the de-noised image is again validated by comparing it with the original image. The technique used for validation of an image has been explained in detail in conjunction with step 314 in FIG. 3. Thus, in other words, the method 500 may be iteratively performed and an output image is iteratively validated until the output image is completely de-noised. After the image has been completely de-noised, it may be provided to a user as an output image.

Figure 6:
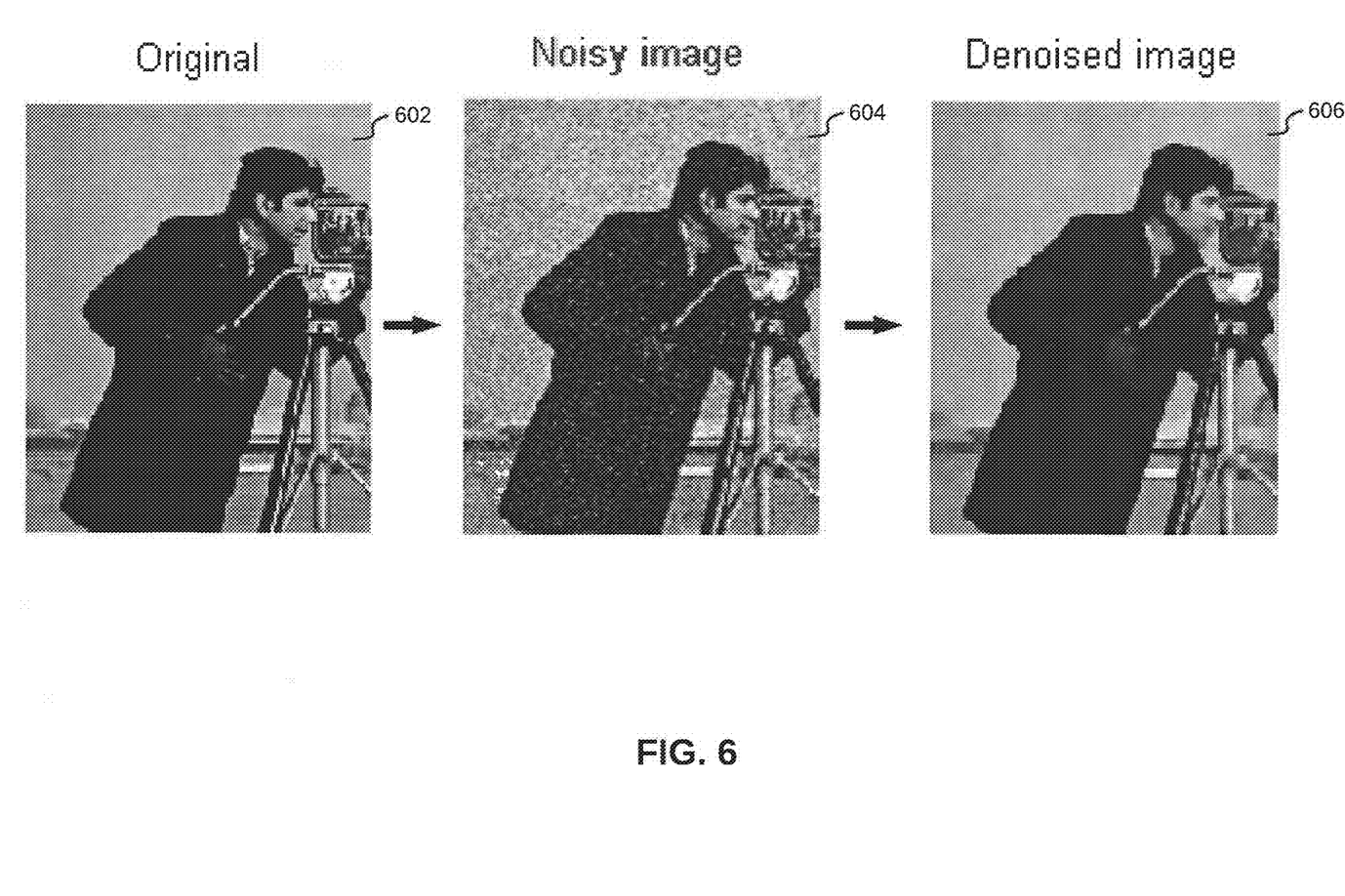
FIG. 6 illustrates exemplary images at different stages of de-noising, in accordance with an exemplary embodiment.

Referring now to FIG. 6, exemplary images at different stages of de-noising are illustrated, in accordance with an exemplary embodiment. An image 602 is an original image and an image 604 is a noisy image that is associated with the image 602. The noise may be artificially introduced in the image 604 in order to train the multi-layer neural network. It will be apparent to a person skilled in the art that the image 604 may be independent of the image 602. In other words, the image 604 may not have any such original image associated with it.

In both the scenarios, in order to remove noise from the image 604, the image 604 may be loaded into the image loader module 202 of the de-noising device 102. Thereafter, the noise detection and removal module 204 of the de-noising device 102 may remove noise from the image 604. This has been explained in detail in conjunction with FIG. 3. When the multi-layer neural network is being trained, the output image provided by the noise detection and removal module 204 may not be completely de-noised and may still include some noise. Thus, in this case, the image 604 after being de-noised is validated against the image 602 (the original image) by the de-noise validation module 206, in order to determine whether the image 604 has been completely de-noised or not. If the image 604 is not completely de-noised, the output image provided by the noise detection and removal module 204 is again provided as an input to the noise detection and removal module 204. This process is repeated till the image 604 has been completely de-noised to generate an image 606. This has been explained in detail in conjunction with FIGS. 2, 3, and 4. When the multi-layer neural network has already been trained, the image 604 will be completely de-noised to directly generate the image 606, without any iterative de-noising process.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
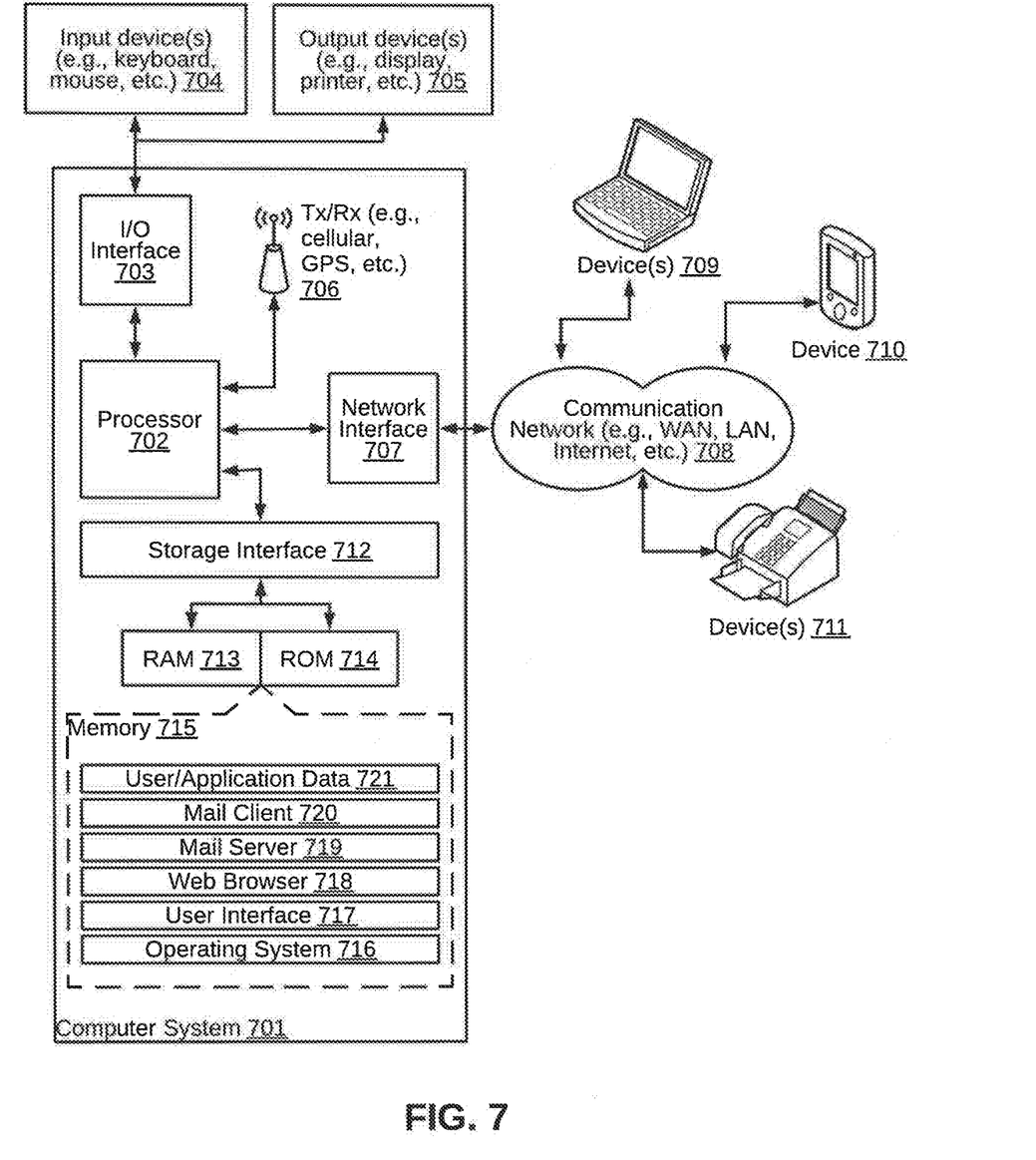
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 for de-noising images. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NEC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE® MACINTOSH® operating systems'

AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 701 may implement a web browser 718 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 701 may implement a mail server 719 stored program component. The mail server may be an Internet mail server such as MICROSOFT® EXCHANGE®, or the like. The mail server may utilize facilities such as ASP, ActiveX, ANSI C++/C #, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. (e.g., document, image document, features and their spatial properties, hierarchy of features, semantic segments, tabular structures, machine learning model, spatial information derived from the hierarchy of features, semantic information corresponding to semantic segments, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above pertain to de-noising of digital images using semantical segments generated from the feature hierarchy's algorithm which provide for higher accuracy in de-noising of images. Further, the techniques are noise-independent, and are capable of detecting all types of noise in the image. Further, the techniques are also able to detect minor noises in the images with respect to the which original image. Further, the techniques provide a scalable approach. Moreover, the techniques (model) may be easily implemented via cloud based servers, and hence may be usable with mobile device applications.

The specification has described method and system for de-noising images. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for de-noising images, the method comprising:
    creating, by an image de-noising device, a single dimensional vector for an image through a multi-layer neural network;
    converting, by the image de-nosing device, the single dimensional vector into a multi-dimensional matrix based on number of layers in the multi-layer neural network;
    generating, by the image de-nosing device, a feature hierarchy based on the multi-dimensional matrix, wherein the feature hierarchy comprises a plurality of levels, and wherein each level in the plurality of levels comprises at least one feature associated with the image;
    creating, by the image de-nosing device, a plurality of segments for the image based on the feature hierarchy, wherein each of the plurality of segments comprises a set of features associated with the image; and
    removing, by the image de-nosing device, each segment comprising noise from the plurality of segments to generate a de-noised image.

2. The method of claim 1, wherein the feature hierarchy comprises a root node representing the image at a first level in the plurality of levels, and wherein features in remaining plurality of levels combine to form the image at the first level.

3. The method of claim 1, wherein creating the plurality of segments for the image comprises determining semantic information associated with each of a plurality of features associated with the image.

4. The method of claim 3 further comprising grouping semantically related features to form each of the plurality of segments.

5. The method of claim 1 further comprising classifying each of the plurality of segments as one of a segment comprising noise and a segment not comprising noise, wherein each segment comprising noise is removed and each segment not comprising noise is retained.

6. The method of claim 1 further comprising validating the de-noised image by comparing vector representation of the de-noised image with vector representation of an original image.

7. The method of claim 6 further comprising:
creating a single dimensional vector for the de-noised image through the multi-layer neural network;
converting the single dimensional vector for the de-noised image into a multi-dimensional matrix based on number of layers in the multi-layer neural network;
generating a feature hierarchy based on the multi-dimensional matrix, wherein the feature hierarchy comprises a plurality of levels, and wherein each level in the plurality of levels comprises at least one feature associated with the de-noised image;
creating a plurality of segments for the de-noised image based on the feature hierarchy, wherein each of the plurality of segments comprises a set of features associated with the de-noised image; and
removing each segment comprising noise from the plurality of segments.

8. The method of claim 7, wherein the de-noised image is iteratively validated to completely remove noise from the image.

9. The method of claim 1, wherein removing each segment comprising noise from the plurality of segments comprises up-sampling the remaining plurality of segments after removal of each segment comprising noise.

10. The method of claim 1 further comprising providing the de-noised image to a user as an output image.

11. An image de-noising device for removing noise from an image, the system image de-noising device comprising:
a processor; and
a memory communicatively coupled to the processor, wherein the memory stores processor instructions, which, on execution, causes the processor to:
create, by an image de-noising device, a single dimensional vector for an image through a multi-layer neural network;
convert, by the image de-nosing device, the single dimensional vector into a multi-dimensional matrix based on number of layers in the multi-layer neural network;
generate, by the image de-nosing device, a feature hierarchy based on the multi-dimensional matrix, wherein the feature hierarchy comprises a plurality of levels, and wherein each level in the plurality of levels comprises at least one feature associated with the image;
create, by the image de-nosing device, a plurality of segments for the image based on the feature hierarchy, wherein each of the plurality of segments comprises a set of features associated with the image; and
remove, by the image de-nosing device, each segment comprising noise from the plurality of segments to generate a de-noised image.

12. The image de-noising device of claim 11, wherein creating the plurality of segments for the image comprises determining semantic information associated with each of a plurality of features associated with the image.

13. The image de-noising device of claim 12, wherein processor instructions further cause the processor to group semantically related features to form each of the plurality of segments.

14. The image de-noising device of claim 11, wherein processor instructions further cause the processor to classifying each of the plurality of segments as one of a segment comprising noise and a segment not comprising noise, wherein each segment comprising noise is removed and each segment not comprising noise is retained.

15. The image de-noising device of claim 11, wherein processor instructions further cause the processor to validate the de-noised image by comparing vector representation of the de-noised image with vector representation of an original image.

16. The image de-noising device of claim 15, wherein processor instructions further cause the processor to:
create a single dimensional vector for the de-noised image through the multi-layer neural network;
convert the single dimensional vector for the de-noised image into a multi-dimensional matrix based on number of layers in the multi-layer neural network;
generate a feature hierarchy based on the multi-dimensional matrix, wherein the feature hierarchy comprises a plurality of levels, and wherein each level in the plurality of levels comprises at least one feature associated with the de-noised image;
create a plurality of segments for the de-noised image based on the feature hierarchy, wherein each of the plurality of segments comprises a set of features associated with the de-noised image; and
remove each segment comprising noise from the plurality of segments.

17. The image de-noising device of claim 16, wherein the de-noised image is iteratively validated to completely remove noise from the image.

18. The image de-noising device of claim 11, wherein processor instructions further cause the processor to remove each segment comprising noise from the plurality of segments comprises up-sampling the remaining plurality of segments after removal of each segment comprising noise.

19. The image de-noising device of claim 11, wherein processor instructions further cause the processor to provide the de-noised image to a user as an output image.

20. A non-transitory computer-readable storage medium having stored thereon, a set of computer-executable instructions causing a computer comprising one or more processors to perform steps comprising:
creating a single dimensional vector for an image through a multi-layer neural network;
converting the single dimensional vector into a multi-dimensional matrix based on number of layers in the multi-layer neural network;
generating a feature hierarchy based on the multi-dimensional matrix, wherein the feature hierarchy comprises a plurality of levels, and wherein each level in the plurality of levels comprises at least one feature associated with the image;

creating a plurality of segments for the image based on the feature hierarchy, wherein each of the plurality of segments comprises a set of features associated with the image; and removing each segment comprising noise from the plurality of segments to generate a de-noised image.

* * * * *